United States Patent Office 3,531,802
Patented Sept. 29, 1970

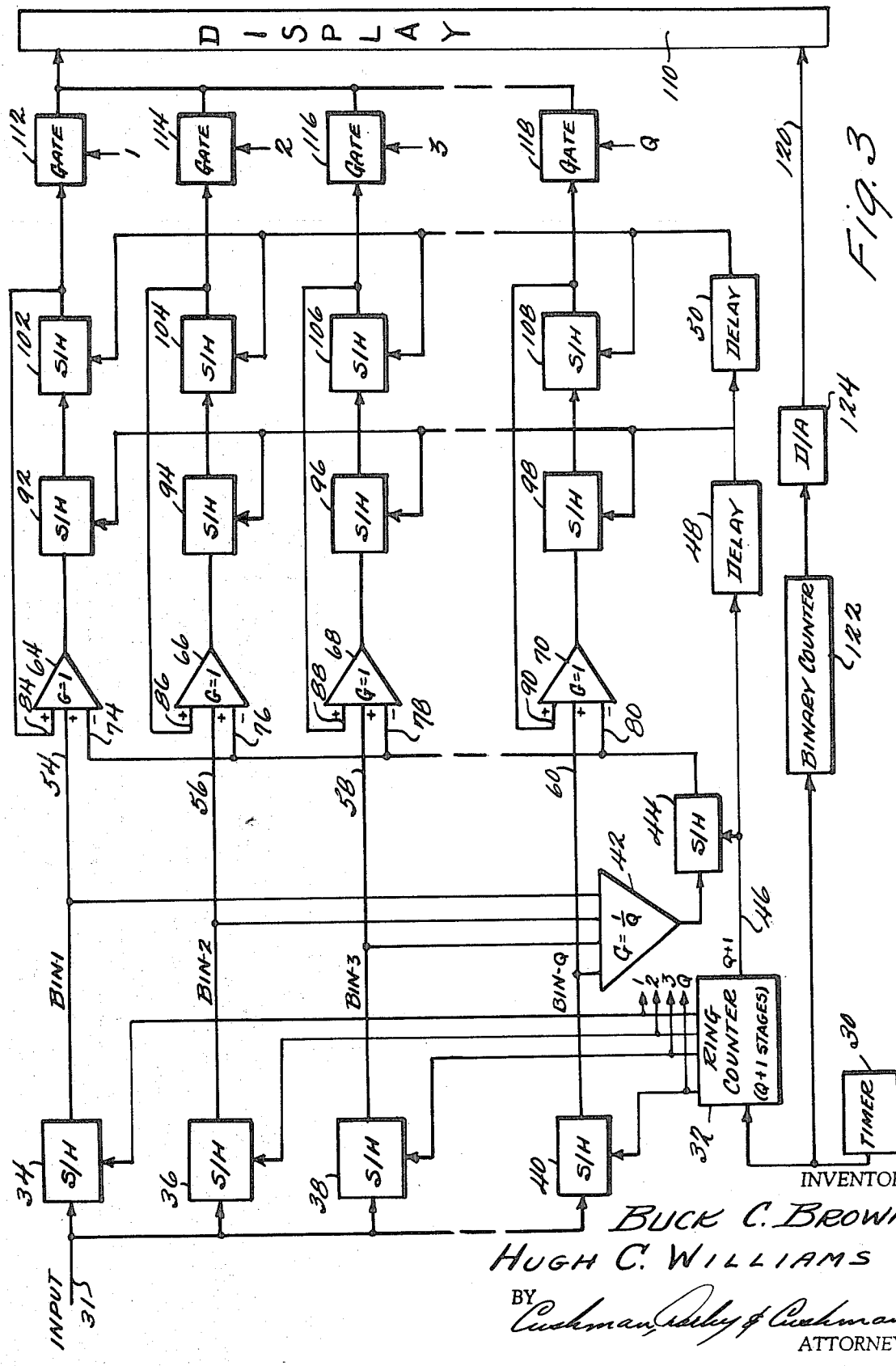

3,531,802
CUMULATIVE ENHANCEMENT SIGNAL PROCESSOR
Buck C. Brown and Hugh C. Williams, Rockville, Md., assignors to Presearch Incorporated, Silver Spring, Md., a corporation of Maryland
Filed Sept. 16, 1968, Ser. No. 759,991
Int. Cl. G01s 7/28; H03k 5/20; H04b 15/00
U.S. Cl. 343—17.1                    12 Claims

ABSTRACT OF THE DISCLOSURE

A signal processor for enhancing the identification of repetitive and similar signals which briefly exist during each of a plurality of repetition intervals and wherein a noise component exists for the duration of each repetition interval. A quantitative average value of each input signal to the processor during a complete repetition interval is determined, and the average value of the input signal is also determined within a predetermined number of time increments. The overall input signal average for each repetition interval is then subtracted from each of the time increment averages to result in a residual signal and this procedure is repeated for each repetition interval. Because the total energy in time intervals containing the repetitive signal plus noise is almost always greater than the energy in time intervals containing noise only, the atypical presence of a repetitive signal during each repetition interval is detected by accumulating the residual and exaggerated signals thus obtained.

BACKGROUND OF THE INVENTION

The present invention relates to a signal processor and more particularly to a system for locating one or more incremental time intervals from a significantly larger time interval wherein the incremental time intervals contain a desired repetitive signal.

The general purpose of this invention is to provide a signal processor which utilizes a unique arrangement of sample-hold circuits in relationship with a ring counter and a plurality of operational amplifiers whereby the energy received by the processor is broken into time increments that are small relative to the total repetition interval. The average of the total energy received during each complete repetition interval is subtracted from the average of each of the time increment signals and the residue is stored to be added to the next signal received in that time increment, at which point the process is repeated.

An object of the present invention is the provision of a cumulative enhancement signal processor which locates one or more incremental time intervals, that contain a desired repetitive signal, from a significantly larger time interval.

Other objects and features of the invention will become apparent to those of ordinary skill in the art as the disclosure is made in the following description of a preferred embodiment of the invention as illustrated in the accompanying sheets of drawings.

Brief description of the drawings

FIG. 3 shows a block diagram of a preferred embodiment of the invention.

Description of a preferred embodiment

Figure 1:
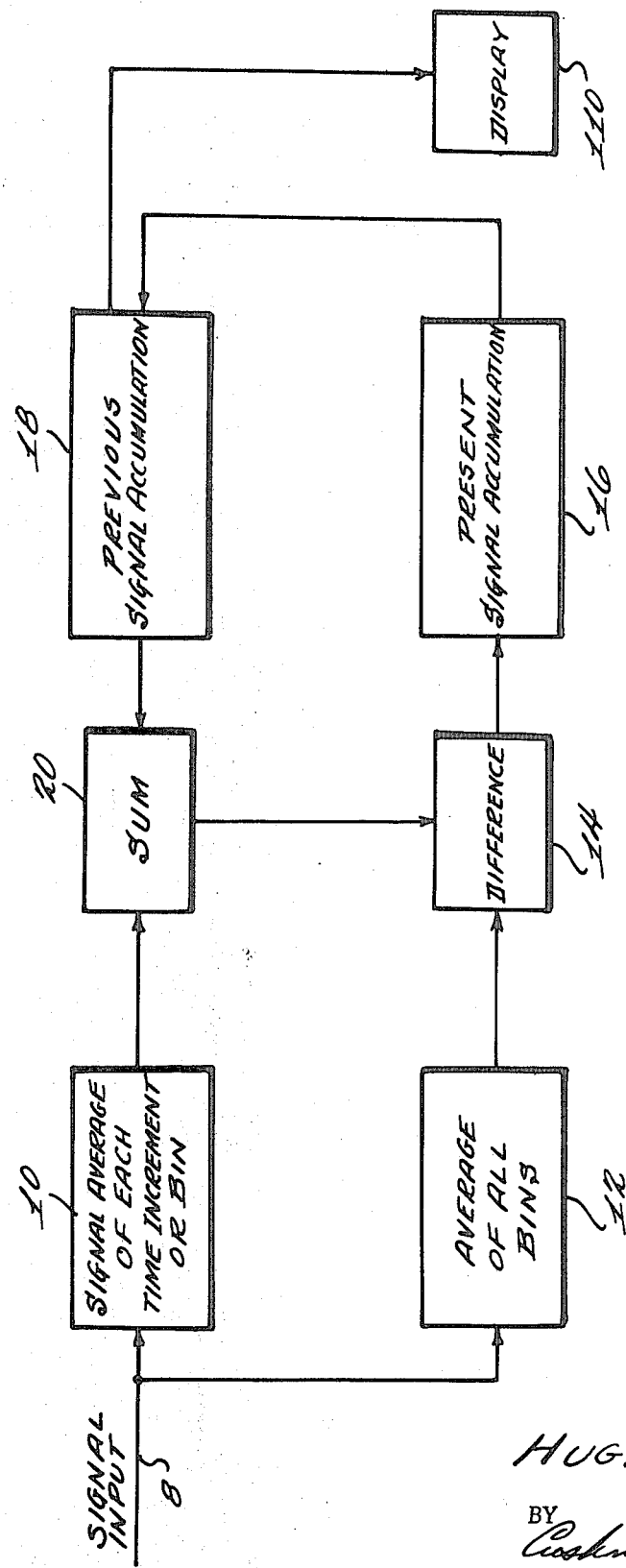
FIG. 1 is a simplified block diagram representing the functional operation of the invention.

With reference to the drawings, there is shown in FIG. 1 a signal input 8 which may originate from a pulse radar, pulse-doppler radar or sonar system wherein the received signals are characterized by being repetitive and similar. The received signal from such systems is also characterized by a desired signal component which briefly exists during the repetition interval and a noise component which exists for the complete repetition interval.

The input signal is divided into a plurality of time increments or bins and the signal average of each of these increments is obtained at element 10. In addition, the average of the total energy received from the input signal during a repetition interval is obtained at the element 12. The difference of the two averages, i.e. the average of energy received in each bin minus the average of the total energy received, is obtained at element 14 and is stored at element 16. During the reception of succeeding input signals, the present signal accumulation is transferred to element 18 from which it is displayed by display 110. This accumulation becomes the previous signal accumulation which, as stored in element 18, is then added bin by bin at element 20 to the new averages of corresponding new bins present at element 10. Thus, the system of FIG. 1 is a continuous or cumulative refinement loop which may be interrupted or recycled at any time by forcing the previous signal accumulation at 18 to zero.

Figure 2:
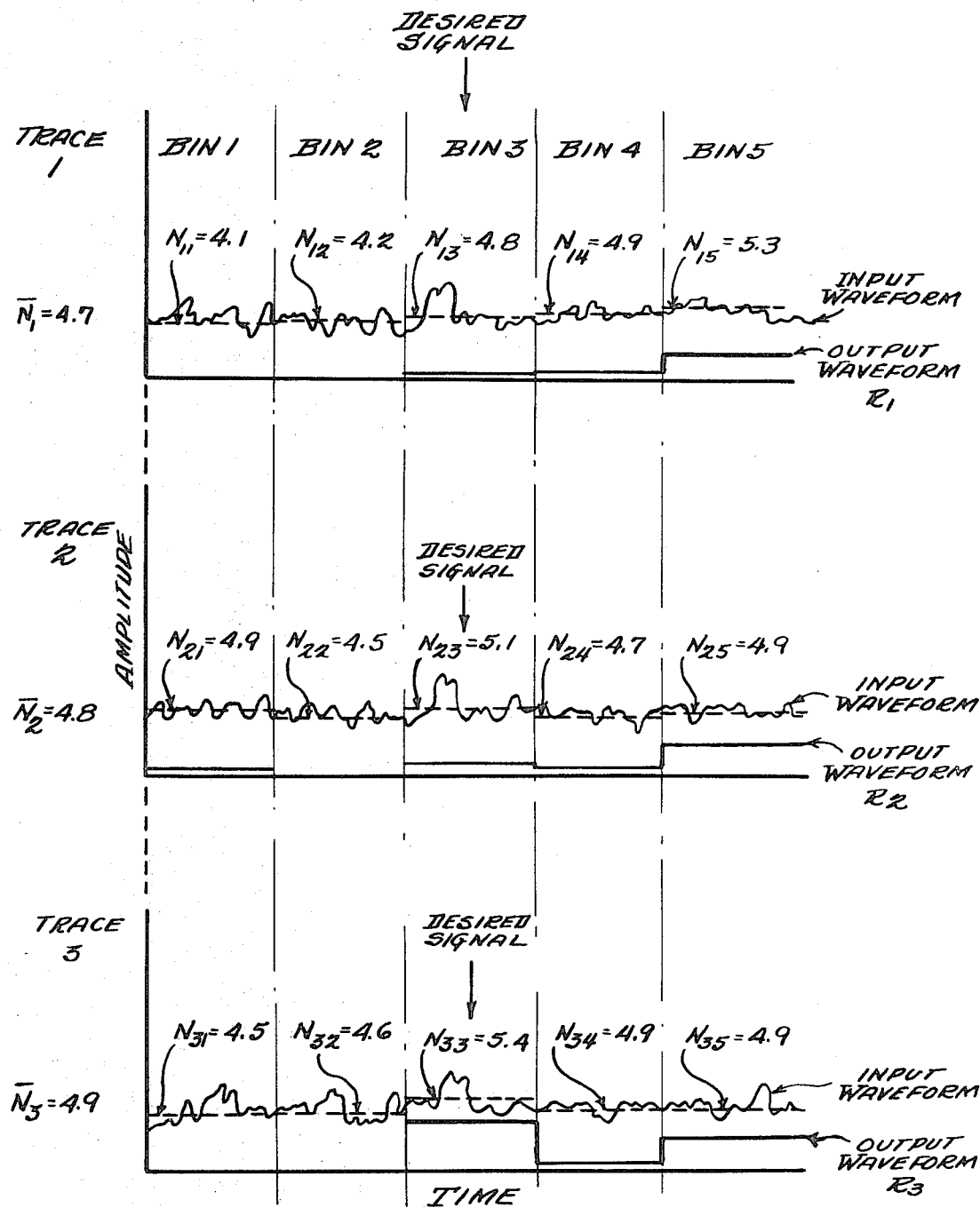
FIG. 2 is a graphical representation of the repetitive signal inputs to the processor and the resultant outputs therefrom.

FIG. 2 is a graphical representation of the signal input and the signal output of the processor. Three traces are shown for the purpose of explanation, each one being divided into five time increments or bins. Each of the input waveforms may represent a return radar or sonar signal in which an echo or other desired signal occurs repeatedly at about the same time after each transmitted pulse occurs. If $\overline{N_n}$ is the average of the entire input waveform in each of the traces (where $n$ is the number of the trace), and $N_{ni}$ is the signal average in the $i$th time increment or bin of the $n$th trace, then the processor subtracts and $N_{1i}-\overline{N_1}=R_{1i}$ is the residue in the $i$th bin of trace number one. Since the signal is of a cyclic or repetitive nature, the next trace will put $N_{2i}$ into the $i$th bin and this will be added to $R_{1i}$ while $\overline{N_2}$ will be subtracted: $N_{2i}-\overline{N_2}+R_{1i}=R_{2i}$ then $N_{3i}-\overline{N_3}+R_{2i}=R_{3i}$ etc. If one of the bins contains an echo along with the noise, the energy in that bin will be consistently larger than $\overline{N}$ for each of a traces so that $N_i-\overline{N}=R_i$ and $R_i>0$ for each trace. Since $R_1>0$ for each trace, the bin containing the echo will accumulate an excess due to the presence of the echo and the detection process will be enhanced so that $R_i$ in the bin containing the echo signal will increase rapidly to a point at which it will be far greater in magnitude than the residual signals present in the remaining bins after the occurrence of several traces. With the illustrative values of $\overline{N}$ and $N_i$ shown in FIG. 2, this can readily be seen by referring to bin 3 where the echo signal occurs. It can also be seen that although in trace 1 the residual signal $R_{15}$ in bin 5 is greater than $R_{13}$ in bin 3, because the average of the signal in bin 3 of each trace is always greater than the average of the entire input waveform while the average of the signal in bin 5 is not, the output waveform in bin 3 after the third trace becomes larger than the output waveforms in the other bins, including bin 5. As additional input signals are received, the waveform in bin 3 rapidly exceeds those of the remaining bins.

An analog version of the signal processor is illustrated in FIG. 3. The processor is provided with two inputs. A pulse timer 30 provides a series of short duration time pulses to ring counter 32 while the input signal to be detected enters at input 31. The ring counter includes a plurality of outputs from which are taken a total number, e.g., $Q+1$, of time increment signals. Simultaneously, the desired signal plus associated noise is applied to Q number of sample and hold circuits 34–40. Circuits of this nature are well known in the art and are characterized in that the leading edge of a time increment pulse from the ring counter 32 immediately destroys all information which may be stored in the sample and hold unit. In addition, each sample and hold unit integrates the input signal for the duration of the pulse it receives from ring counter 32. This integral is then held by the sample and hold units until another time increment pulse is received from the ring counter 32. Thus, the input sample and hold units 34–40 are each utilized to obtain an integral value of a different increment of the input signal, there being Q increments.

The outputs from each of the sample and hold circuits 34–40 are then added and the sum is multiplied by $1/Q$ by operational amplifier 42. Thus, an average value $\overline{N}$ of the input signal exists at the output of operational amplifier 42 and is directed to sample and hold circuit 44 where the average signal value is stored at a time corresponding to a ring counter pulse of $Q+1$. The ring counter pulse at time $Q+1$, which is provided on output line 46 of the ring counter 32, is delayed twice by delays 48 and 50 to provide additional data processing intervals. The first delayed interval provided by delay 48 enables the storing of current information while the second delay 50 enables the storing of information from the previous data gathering interval.

The outputs from sample and hold circuits 34–40 are added at the inputs 54–60 of operational amplifiers 64–70, respectively. The average value of the input signal as provided from the sample and hold circuit 44 is simultaneously subtracted at inputs 74–80 of operational amplifiers 64–70, respectively. At the same time, signals from the previous trace which have already been processed by the amplifiers 64–70 are added at amplifier inputs 84–90 of amplifiers 64–70, respectively. As a result, the outputs of the operational amplifiers 64–70 represent the average of the input signal for each time increment minus the average of the entire input signal during the repetition interval plus the signals in each time increment which have accumulated from prior operations of the amplifiers 64–70. The outputs of these amplifiers are then stored in sample and hold circuits 92–98 and represent the results of current processing. The next set of sample and hold circuits 102–108 are driven by the second delayed $Q+1$ pulse from ring counter 32 and are updated to current processing after the delay provided by delay 50. Thus, the sample and hold circuits 102–108 are updated to store the most recent accumulation of signals for each respective time increment upon the occurrence of each delayed $Q+1$ pulse from ring counter 32, and these sample and hold circuits store the information for display and for successive processing by amplifiers 64–70, respectively.

One useful data presentation can be obtained by using a standard storage oscilloscope represented as display 110. The processed data present in sample and hold circuits 102–108 must be presented sequentially as a function of time in order to provide a display as represented by the output waveforms in FIG. 2. Appropriate sequencing is obtained by commutating the outputs of sample and hold circuits 102–108 with gates 112–118, respectively, that are driven by ring counter 32. The gate outputs are connected in parallel and are coupled to the vertical input of display or oscilloscope 110. A horizontal input 120 provides a time sweep voltage that is produced by digitally counting pulses from timer 30 by means of a binary counter 122. The output of the counter 122 is then converted to an analog voltage by means of digital-to-analog converter 124.

Although a specific analog embodiment of the invention has been described in detail, it should be understood that operational variations such as the number or placement of the basic time intervals may be produced by minor modifications to the ring counter 32 or to the input pulses from timer 30.

It is also necessary to determine and/or control the total number of traces used to provide each signal accumulation. This function can be accomplished by periodically manually or automatically resetting the output sample and hold circuits 102–108 to zero. It should also be understood that the basic functions of addition, subtraction, division and data storage required for the signal processing described above may be performed by digital as well as analog devices. Although digital circuitry is inherently reliable and stable, the required accuracy and resolution for the system described is obtainable with digital circuitry only with significantly increased cost and complexity. It is for this reason that an analog device is set forth as a preferred embodiment.

Thus, it should be understood that various modifications are contemplated and may obviously be resorted to by those of ordinary skill in the art without departing from the spirit and scope of the invention, as hereinafter defined by the appended claims.

What is claimed is:

1. A cumulative enhancement signal processor for aiding the detection of repetitive and similar signals which exist in conjunction with a noise component in an input signal for only a short time relative to a complete repetitive interval and wherein the noise component exists for the complete repetition interval, comprising:
    means for dividing said input signal into a predetermined number of time increments;
    means operatively associated with said dividing means for integrating said input signal during each of said time increments;
    means operatively associated with said integrating means for determining the average value of said input signal during said complete repetition interval;
    means for storing the average value of said signal during each of said time increments from an immediately preceding input signal minus the average value of said immediately preceding input signal; and
    means operatively associated with said determining means, said storing means and said integrating means for combining the signal outputs therefrom.

2. A processor as in claim 1 further including:
    first sample-hold circuit means in circuit between said combining means and said storing means for storing the output from said combining means.

3. A processor as in claim 2 further including:
    gate means coupled between said storing means and said dividing means for sequentially gating the outputs from said storing means to the output of said processor, said sequence being determined by said dividing means.

4. A processor as in claim 3 further including:
    first delay means in circuit between said dividing means and said first sample-hold circuit means.

5. A processor as in claim 4 further including:
    second delay means in circuit between said first delay means and said storing means.

6. A processor as in claim 5 further including:
    sweep circuit means in operative relationship with said dividing means for enabling the display on a time basis of said gated processor output.

7. A processor as claimed in claim 6 further including:
    second sample-hold circuit means in operative relationship with said determining means for storing the output therefrom and in operative relationship with said combining means for providing inputs thereto at predetermined times as determined by said dividing means.

8. A processor as in claim 1 wherein said dividing means includes:
   timer means for providing output pulses of predetermined spacing and duration; and
   counter means in circuit with said timer means and said integrating means for sequentially activating said integrating means.

9. A processor as in claim 8 wherein said integrating means include a plurality of sample-hold circuits in circuit with said counter means and in parallel circuit relationship with an input to said processor.

10. A processor is in claim 9 wherein said determining means includes a first operational amplifier and wherein said combining means includes a plurality of operational amplifiers in parallel circuit relationship with said first amplifier.

11. A processor as in claim 10 wherein said storing means includes a second plurality of sample-hold circuits, the outputs of which are respectively coupled to the inputs of said plurality of amplifiers.

12. A cumulative enhancement signal processor for aiding the detection of repetitive and similar signals which exist in conjunction with a noise component in an input signal for only a short time relative to a complete repetitive interval and wherein the noise component exists for the complete repetition interval, comprising:
   means for dividing said input signal into a predetermined number of time increments;
   means operatively associated with said dividing means for averaging said input signal during each of said time increments;
   means for determining the average value of said input signal for said complete repetition interval;
   means joined to both the aforementioned averaging means for subtracting the average value of the input signal for a complete repetition interval from each of the input signal averages for the time increments to produce residues for each increment; and
   means for combining said residues and the averages of respective increments of a subsequent input signal for application to said subtracting means to produce new residues.

References Cited
UNITED STATES PATENTS

| | | | |
|---|---|---|---|
| 2,736,021 | 2/1956 | Sunstein | 328—127 XR |
| 3,201,702 | 8/1965 | Hanulec et al. | 328—110 XR |
| 3,374,435 | 3/1968 | Engel | 328—165 XR |
| 3,386,077 | 5/1968 | Molho | 343—17.1 XR |

RODNEY D. BENNETT, Primary Examiner

M. F. HUBLER, Assistant Examiner

U.S. Cl. X.R.

328—110, 127, 151, 165